US011498514B2

(12) United States Patent
Ebner et al.

(10) Patent No.: US 11,498,514 B2
(45) Date of Patent: Nov. 15, 2022

(54) OVERIGNITING PROTECTION DEVICE, SECOND IGNITION STAGE, GAS GENERATOR AND AIRBAG MODULE

(71) Applicant: TRW Airbag Systems GmbH, Aschau a. Inn (DE)

(72) Inventors: Johannes Ebner, Mühldorf am Inn (DE); Hans-Peter Neumayer, Ampfing (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 57 days.

(21) Appl. No.: 16/632,628

(22) PCT Filed: Jul. 16, 2018

(86) PCT No.: PCT/EP2018/069220
§ 371 (c)(1),
(2) Date: Jan. 21, 2020

(87) PCT Pub. No.: WO2019/020414
PCT Pub. Date: Jan. 31, 2019

(65) Prior Publication Data
US 2020/0148159 A1 May 14, 2020

(30) Foreign Application Priority Data

Jul. 26, 2017 (DE) ............ 102017116868.0
Feb. 16, 2018 (DE) ............ 202018100870.6

(51) Int. Cl.
*B60R 21/263* (2011.01)
*B60R 21/264* (2006.01)
(Continued)

(52) U.S. Cl.
CPC .......... *B60R 21/272* (2013.01); *B60R 21/263* (2013.01); *B60R 21/2644* (2013.01);
(Continued)

(58) Field of Classification Search
CPC ..... B60R 21/26; B60R 21/263; B60R 21/264; B60R 2021/2765
See application file for complete search history.

(56) References Cited

U.S. PATENT DOCUMENTS 4,964,652 A * 10/1990 Karlow ................. B60R 21/276
280/731
5,533,752 A * 7/1996 Brown ..................... B60R 21/21
137/67
(Continued)

FOREIGN PATENT DOCUMENTS

| CN | 207274622 | 4/2018 |
| JP | 2001114064 | 4/2001 |
| WO | 2007003395 | 1/2007 |

*Primary Examiner* — Barry Gooden, Jr.
(74) *Attorney, Agent, or Firm* — Tarolli, Sundheim, Covell & Tummino LLP

(57) ABSTRACT

The invention relates to an overigniting protection device (40) for a multi-stage gas generator (10), comprising a combustion chamber limiting element (34) for limiting a combustion chamber (30) of a second ignition stage (14) of the gas generator (10) as well as an overigniting protection element (38) which is arranged on a side of the combustion chamber limiting element (34) remote from the combustion chamber (30), wherein the overigniting protection element (38) covers the side of the combustion chamber limiting element (34) remote from the combustion chamber (30), wherein the overigniting protection element (38) is tightly connected to the combustion chamber limiting element (34) via a mounting portion (42) and wherein the overigniting protection element (38) is substantially plate-shaped or completely covers the side of the combustion chamber limiting element (34) remote from the combustion chamber (30). Furthermore, the invention relates to a second ignition stage (14) of a multi-stage gas generator, a gas generator (10) and an airbag module comprising a gas generator (10).

26 Claims, 6 Drawing Sheets

(51) Int. Cl.
   *B60R 21/272* (2006.01)
   *B60R 21/274* (2011.01)
   *B60R 21/268* (2011.01)

(52) U.S. Cl.
   CPC ..... *B60R 21/274* (2013.01); *B60R 2021/2633* (2013.01); *B60R 2021/2648* (2013.01); *B60R 2021/2685* (2013.01); *B60R 2021/2725* (2013.01)

(56) References Cited

U.S. PATENT DOCUMENTS

| | | | |
|---|---|---|---|
| 5,582,428 A | 12/1996 | Buchanan et al. | |
| 5,664,802 A * | 9/1997 | Harris | B60R 21/272 |
| | | | 280/736 |
| 5,853,192 A * | 12/1998 | Sikorski | B60R 21/276 |
| | | | 280/739 |
| 5,899,494 A * | 5/1999 | Lane, Jr. | B60R 21/276 |
| | | | 280/739 |
| 5,970,880 A * | 10/1999 | Perotto | B60R 21/2644 |
| | | | 102/531 |
| 6,062,599 A * | 5/2000 | Forbes | F16K 13/06 |
| | | | 280/737 |
| 6,116,642 A * | 9/2000 | Shirk | B60R 21/264 |
| | | | 280/736 |
| 6,145,877 A * | 11/2000 | Rink | B60R 21/264 |
| | | | 280/737 |
| 6,199,895 B1 * | 3/2001 | Seymour | B60R 21/276 |
| | | | 280/728.2 |
| 6,237,498 B1 | 5/2001 | Winterhalder et al. | |
| 6,241,279 B1 * | 6/2001 | Ochiai | B60R 21/26 |
| | | | 280/735 |
| 6,279,949 B1 * | 8/2001 | Braunschadel | B60R 21/276 |
| | | | 280/739 |
| 6,382,668 B1 | 5/2002 | Goetz | |
| 6,422,600 B1 * | 7/2002 | Crohn | B60R 21/217 |
| | | | 280/736 |
| 7,370,884 B2 * | 5/2008 | Clark | B60R 21/26 |
| | | | 280/728.2 |
| 8,556,294 B1 * | 10/2013 | Norman, III | B60R 21/263 |
| | | | 280/741 |
| 8,651,520 B2 * | 2/2014 | Jung | B60R 21/274 |
| | | | 280/737 |
| 8,656,838 B1 | 2/2014 | Mayville | |
| 9,073,512 B1 * | 7/2015 | Mayville | C06D 5/00 |
| 9,295,935 B1 * | 3/2016 | Adamczyk | B01D 46/0097 |
| 2001/0038201 A1 * | 11/2001 | Ryan | B60R 21/276 |
| | | | 280/742 |
| 2002/0145274 A1 * | 10/2002 | Magoteaux | B60R 21/276 |
| | | | 280/740 |
| 2004/0021307 A1 * | 2/2004 | Ziolo | B60R 21/276 |
| | | | 280/739 |
| 2004/0169359 A1 * | 9/2004 | Isakov | B60R 21/276 |
| | | | 280/736 |
| 2005/0017490 A1 | 1/2005 | Yamazaki | |
| 2005/0206144 A1 | 9/2005 | Numoto et al. | |
| 2005/0253368 A1 * | 11/2005 | Andersson | B60R 21/276 |
| | | | 280/739 |
| 2006/0033316 A1 * | 2/2006 | Keutz | B60R 21/276 |
| | | | 280/739 |
| 2006/0157959 A1 * | 7/2006 | van Poppel | B60R 21/276 |
| | | | 280/735 |
| 2007/0029762 A1 * | 2/2007 | Katsuda | B60R 21/2338 |
| | | | 280/728.2 |
| 2007/0075536 A1 * | 4/2007 | Kelley | B60R 21/276 |
| | | | 280/737 |
| 2007/0158934 A1 | 7/2007 | Lee et al. | |
| 2008/0136152 A1 * | 6/2008 | McFarland | B60R 21/264 |
| | | | 280/736 |
| 2009/0020990 A1 * | 1/2009 | Townsend | B60R 21/264 |
| | | | 280/737 |
| 2009/0179408 A1 * | 7/2009 | Brisighella, Jr. | B60R 21/26 |
| | | | 280/741 |
| 2010/0052298 A1 * | 3/2010 | Schneider | B60R 21/239 |
| | | | 280/739 |
| 2010/0071580 A1 * | 3/2010 | Nakayasu | B60R 21/261 |
| | | | 102/530 |
| 2012/0247361 A1 * | 10/2012 | Kobayashi | B60R 21/2644 |
| | | | 102/530 |
| 2014/0290523 A1 * | 10/2014 | Yano | B60R 21/264 |
| | | | 102/530 |
| 2014/0311375 A1 * | 10/2014 | Divo | B29C 45/14598 |
| | | | 102/530 |
| 2015/0343982 A1 * | 12/2015 | Fechner | B60R 21/276 |
| | | | 280/728.2 |
| 2016/0159314 A1 * | 6/2016 | Ebner | B60R 21/261 |
| | | | 280/737 |
| 2018/0043854 A1 * | 2/2018 | Kobayashi | B60R 21/261 |
| 2018/0056925 A1 * | 3/2018 | Yamada | B60R 21/217 |
| 2019/0023212 A1 * | 1/2019 | Spahn | B60R 22/023 |
| 2019/0126886 A1 * | 5/2019 | Ukita | B60R 21/26 |
| 2019/0383589 A1 * | 12/2019 | Boutin | B60R 21/264 |

\* cited by examiner

OVERIGNITING PROTECTION DEVICE, SECOND IGNITION STAGE, GAS GENERATOR AND AIRBAG MODULE

RELATED APPLICATIONS

This application corresponds to PCT/EP2018/069220, filed Jul. 16, 2018, which claims the benefit of German Applications Nos. 10 2017 116 868.0, filed Jul. 26, 2017 and 20 2018 100 870.6, filed Feb. 16, 2018, the subject matter of which are incorporated herein by reference in their entirety.

BACKGROUND OF THE INVENTION

The invention relates to an overigniting protection device for a multi-stage gas generator, to a second ignition stage of a multi-stage gas generator and to a gas generator. Further, the invention relates to an airbag module.

Gas generators are in use in modern automotive vehicles in various ways to inflate an airbag with a required inflation gas extremely quickly. Inter alia, here are used multi-stage gas generators comprising at least two ignition stages so that, for example, the inflation behavior of the gas generator can be appropriately adjusted. For example, only a first stage of the gas generator ignites so that in total less inflation gas is provided than when all ignition stages of the multi-stage gas generator are ignited.

The multi-stage gas generators may be so-called hybrid gas generators which have a pyrotechnical ignition stage and an ignition stage having a share of compressed gas, wherein here in the not yet activated state of the hybrid gas generator already an area biased by compressed gas is comprised. There are also known multi-stage gas generators which comprise exclusively purely pyrotechnical stages, i.e. are free from a compressed gas area.

In general, for a monitored control of the multi-stage gas generators it must be safeguarded that merely the desired number of ignition stages is ignited. For this purpose, appropriate overigniting protection devices are provided to prevent, upon release of the first ignition stage, another ignition stage from being activated inadvertently by energy input from the activated first ignition stage, for example by the gases or hot particles thereof. The overigniting protection devices known from prior art have a relatively complex structure, which causes the manufacture of the multi-stage gas generators to be complicated and thus expensive.

SUMMARY OF THE INVENTION

It is the object of the invention to provide an inexpensive option of configuring a multi-stage gas generator including an operative overigniting protection device.

According to the invention, the object is achieved by an overigniting protection device for a multi-stage gas generator, comprising a combustion chamber limiting element for limiting a combustion chamber of a second ignition stage of the gas generator as well as an overigniting protection element arranged on a side of the combustion chamber limiting element remote from the combustion chamber, wherein the overigniting protection element cover the side of the combustion chamber limiting element remote from the combustion chamber, wherein the overigniting protection element is tightly connected to the combustion chamber limiting element via a mounting portion, and wherein the overigniting protection element is substantially plate-shaped or completely covers the side of the combustion chamber limiting element remote from the combustion chamber.

Further, the object is achieved, according to the invention, by a second ignition stage of a multi-stage gas generator, comprising a combustion chamber, a combustion chamber limiting element limiting the combustion chamber as well as an overigniting protection element arranged on a side of the combustion chamber limiting element remote from the combustion chamber, wherein the overigniting protection element covers the combustion chamber limiting element, wherein the overigniting protection element is tightly connected to the combustion chamber limiting element via a mounting portion and wherein the overigniting protection element is substantially plate-shaped or completely covers the side of the combustion chamber limiting element remote from the combustion chamber.

Moreover, according to the invention the object is achieved by a gas generator having a first ignition stage, a second ignition stage and an overigniting protection device, the overigniting protection device being configured according to the afore-described manner or the second ignition stage being configured according to the afore-described manner.

In addition, according to the invention, an airbag module comprising a gas generator, an airbag inflatable by the gas generator and a mounting unit for attaching the airbag module to a vehicle is provided, the gas generator comprising an appropriate gas generator of the afore-mentioned type.

It is the basic idea of the invention that an overigniting protection device is provided comprising an overigniting protection element which covers and, resp., seals a combustion chamber of the second ignition stage, thus ensuring that no burn-off gas of another ignition stage and, resp., hot particles resulting therefrom will inadvertently ignite the second ignition stage. The overigniting protection element is tightly connected to the combustion chamber limiting element via a mounting portion so that, upon activation of the second ignition stage, the overigniting protection element will not even detach from the combustion chamber limiting element in the area of the mounting portion. Since the overigniting protection element is substantially plate-shaped, a compact arrangement is provided which moreover ensures the overigniting protection element to fully bear against the combustion chamber limiting element when the first ignition stage is released. Substantially plate-shaped in this context means that the overigniting protection element substantially has a constant thickness or height and thus no bulges or the like. The complete covering of the combustion chamber limiting element provides for an appropriately large bearing surface, viz. a maximum covering surface, so that no hot particles or ignition gases of a first released ignition stage can enter into the interior of the second ignition stage. Thus, inadvertent activation of the second ignition stage is efficiently inhibited, with the overigniting protection element at the same time ensuring that the second ignition stage, especially the combustion chamber of the second ignition stage, is sealed.

In the second ignition stage further sealing elements, such as a bursting membrane, a sealing film or the like, can be dispensed with.

According to one aspect, between the first ignition stage and the second ignition stage a diffusor having a diffusor chamber is provided. Accordingly, the inflation gas generated via the ignition stages is passed via the diffusor into an airbag of an airbag module which comprises and, resp., is connected to the gas generator.

The overigniting protection device is configured such that, in or after a case of release of the gas generator, the overigniting protection element extends at least partly in the direction of the diffusor chamber. This means that, upon ignition of the associated second ignition stage, areas of the overigniting protection element move in the direction of the diffusor chamber so that the inflation gas provided by the second ignition stage can escape into the diffusor chamber. Such partial extension or movement of the overigniting protection element can take place, for example, by a bending and/or partial folding of portions of the overigniting protection element which can be produced due to a formed internal pressure of the activated second ignition stage that is escaping.

According to one embodiment, at least the second ignition stage is a purely pyrotechnical ignition stage. Accordingly, in the combustion chamber of the second ignition stage no compressed gas is provided prior to activation of the second ignition stage. The first ignition stage, too, may be a purely pyrotechnical ignition stage so that the entire multi-stage gas generator is a purely pyrotechnical gas generator.

According to another embodiment, the first ignition stage is an ignition stage comprising compressed gas prior to activation of the first ignition stage so that the gas generator is a hybrid gas generator. Consequently, the first ignition stage comprises a burst disk which will rupture or burst upon ignition of the first ignition stage, thus causing the prestored compressed gas associated with the first ignition stage to escape so as to co-inflate an airbag of the airbag module associated with the gas generator.

In one embodiment of the overigniting protection device according to the invention already described further above, the combustion chamber limiting element may as well be a combustion chamber disk.

Furthermore, in a preferred embodiment, in the overigniting protection device the combustion chamber limiting element may have a radially externally arranged collar to which the mounting portion is tightly connected at a radial outer face of the overigniting protection element.

Furthermore, in a preferred embodiment, in the overigniting protection device the overigniting protection element can be materially mounted, especially welded, to the combustion chamber limiting element in the area of the mounting portion.

Further, in a preferred embodiment, in the overigniting protection device the overigniting protection element can include a deforming portion which is deformable such that gas can escape from the second ignition stage via the deforming portion.

Further, in a preferred embodiment, in the overigniting protection device the deforming portion can be arranged centrally on the overigniting protection element.

Furthermore, in a preferred embodiment, in the overigniting protection device the mounting portion can be surrounded, especially radially outwardly, by the deforming portion.

Furthermore, in a preferred embodiment, in the overigniting protection device the overigniting protection element may comprise a predetermined rupturing point or a predetermined breaking point via which gas can escape from the second ignition stage.

Furthermore, in a preferred embodiment, in the overigniting protection device the overigniting protection element can have a peripheral collar-shaped edge, especially at its radial outer face.

Furthermore, in a preferred embodiment, in the overigniting protection device the overigniting protection element may comprise a central recess.

Furthermore, in a preferred embodiment, in the overigniting protection device the overigniting protection element can be substantially disk-shaped.

In one embodiment of the second ignition stage of a multi-stage gas generator according to the invention already described further above, the overigniting protection element can cover openings in the combustion chamber limiting element which are otherwise free from sealing elements.

Furthermore, in a preferred embodiment, in the second ignition stage the combustion chamber limiting element may be a combustion chamber disk.

Furthermore, in a preferred embodiment, in the second ignition stage the combustion chamber limiting element can comprise a radially outwardly arranged collar to which the mounting portion is tightly connected on a radial outer face of the overigniting protection element.

Furthermore, in a preferred embodiment, in the second ignition stage the overigniting protection element can be welded to the combustion chamber limiting element in the area of the mounting portion.

Furthermore, in a preferred embodiment, in the second ignition stage, the overigniting protection element may have a deforming portion which is deformable such that gas may escape from the second ignition stage via the deforming portion.

Furthermore, in a preferred embodiment, in the second ignition stage, the deforming portion can be arranged centrally on the overigniting protection element.

Furthermore, in a preferred embodiment, in the second ignition stage, the mounting portion can be surrounded, especially radially outwardly, by the deforming portion.

Furthermore, in a preferred embodiment, in the second ignition stage the overigniting protection element can have a predetermined rupturing point or a predetermined breaking point via which gas can escape from the second ignition stage.

Furthermore, in a preferred embodiment, in the second ignition stage the overigniting protection element can include a peripheral collar-shaped edge, especially at its radial outer face.

Furthermore, in a preferred embodiment, in the second ignition stage the overigniting protection element may have a central recess.

Furthermore, in a preferred embodiment, in the second ignition stage the overigniting protection element can be substantially disk-shaped.

In one embodiment of the gas generator according to the invention already described further above, between the first ignition stage and the second ignition stage a diffusor having a diffusor chamber can be provided.

Furthermore, in a preferred embodiment, in the gas generator the overigniting protection element can extend at least partially in the direction of the diffusor chamber after a case of release of the gas generator.

Furthermore, in a preferred embodiment, in the gas generator at least the second ignition stage may be a purely pyrotechnical ignition stage.

Furthermore, in a preferred embodiment, in the gas generator the first ignition stage may be an ignition stage comprising compressed gas so that the gas generator is a hybrid gas generator.

BRIEF DESCRIPTION OF THE DRAWINGS

Further advantages and characteristics of the invention will be evident from the following description and the drawings which are referred to, and wherein.

DESCRIPTION

Figure 1:
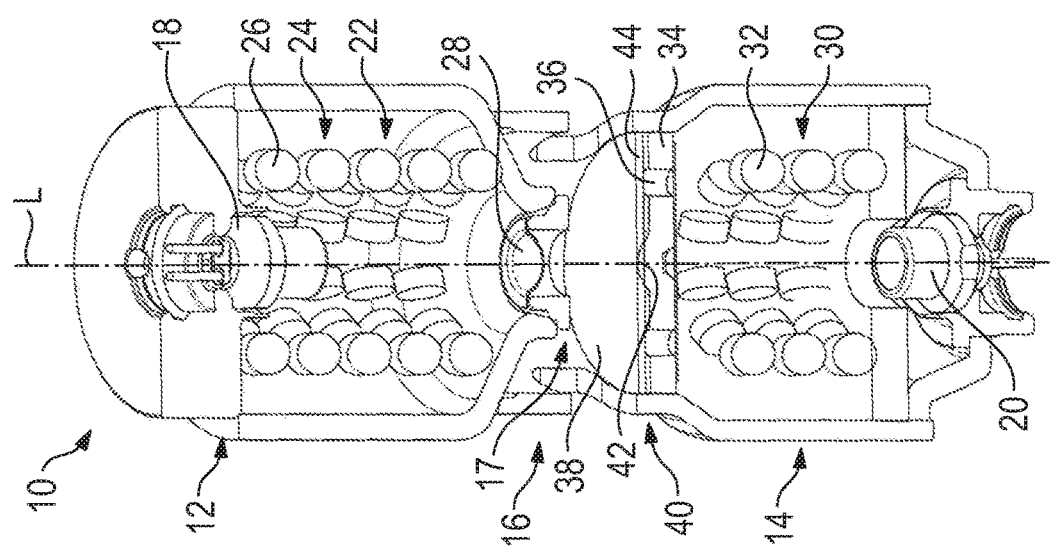
FIG. 1 shows a perspective sectional view of a gas generator according to the invention in accordance with a first embodiment in the initial state.

FIG. 1 illustrates a gas generator 10 comprising a first ignition stage 12 and a second ignition stage 14 each being coupled to a diffusor 16 which includes a diffusor chamber 17. The diffusor 16 is arranged in a longitudinal axial manner, viz. along the longitudinal axis L of the gas generator 10, between the two ignition stages 12, 14.

Each of the two ignition stages 12, 14 comprises an igniter 18, 20 being electrically activatable, wherein they include appropriate contact pins.

In the shown embodiment, the first ignition stage 12 comprises a first combustion chamber 22 in which a compressed gas 24 and a propellant 16 are disposed. The propellant 26 may comprise a bed of individual propellant bodies such as e.g. compressed propellant pellets or extruded bodies, but may as well be present in the form of a monolithic molded body or in the form of lined-up discs or rings.

The first pressure chamber 22 is surrounded by a housing portion of the first ignition stage 12, wherein it is axially closed off by the igniter 18 and additionally via a burst membrane 28 provided in the transition area to the diffusor 16.

The second ignition stage 14 comprises a second combustion chamber 30 in which merely a pyrotechnical propellant 32 is arranged, which means that no prestored compressed gas is accommodated in the second combustion chamber 30 in the idle state or in the non-activated initial state of the gas generator.

In this respect, the second ignition stage 14 is a purely pyrotechnical ignition stage so that the gas generator 10 is in the form of a hybrid gas generator due to the first ignition stage 12 comprising compressed gas.

Alternatively, also the first ignition stage 12 may be a purely pyrotechnical ignition stage so that the entire gas generator 10 is in the form of a purely pyrotechnical gas generator which does not comprise any prestored compressed gas in its idle state or non-activated initial state.

The second combustion chamber 30 is limited toward the diffusor 16 by a combustion chamber limiting element 34, with the combustion chamber limiting element 34 being in the form of a combustion chamber disk.

In the combustion chamber limiting element 34 plural openings 36 are provided which may be closed toward the second combustion chamber 32 via a sealing film or the like attached to the side of the combustion chamber limiting element 34 facing the combustion chamber 32, as is illustrated in FIG. 1.

On the side of the combustion chamber limiting element 34 directed toward the diffusor 16, there is arranged an overigniting protection element 38 which completely covers the combustion chamber limiting element 34, viz. also completely covers the openings 36, and moreover is plate-shaped.

Figure 3:
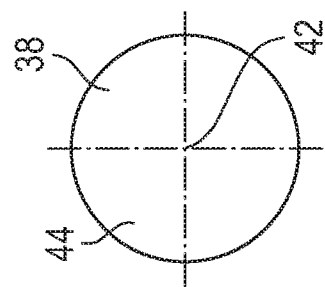
FIG. 3 shows a top view onto an overigniting protection element which is used in the gas generator of FIGS. 1 and 2.

The overigniting protection element 38 is illustrated in more detail in a top view in FIG. 3. It is evident herefrom that the overigniting protection element 38 is equally a disk having substantially the same outer diameter as the combustion chamber disk so that it covers the latter substantially completely.

In addition, the overigniting protection element 38 is configured to be uninterrupted, i.e. without any openings, recesses or the like, so that it is particularly stable.

The openings 36 toward the second combustion chamber 32 also may be open, viz. free from sealing elements, due to the overigniting protection element 32.

If the first ignition stage 12 is activated, the burst disk 28 will rupture or will be opened as intended, resp., so that the compressed gas 24 and a corresponding burn-off gas of the propellant 26 can escape via the diffusor 16 as intended toward an airbag to be inflated (not shown). The overigniting protection element 38 ensures that neither hot particles nor gases may enter from the first ignition stage 12 via the opening 36 into the second combustion chamber 30 so that the propellant 32 of the second ignition stage 14 provided there will not be inadvertently ignited.

In this respect, an efficient overigniting protection device 40 is provided.

Rather, the burn-off gases of the first ignition stage 12 or, resp., an optional compressed gas are not only prevented from flowing into the second combustion chamber 30, but the pressure exerted by the burn-off gases and, resp., the compressed gas on the overigniting protection element 38 additionally improves the overigniting protection device 40, as the overigniting protection element 38 is pressed more strongly onto the combustion chamber limiting element 34 and additionally or even more efficiently seals the openings 36.

Figure 2:
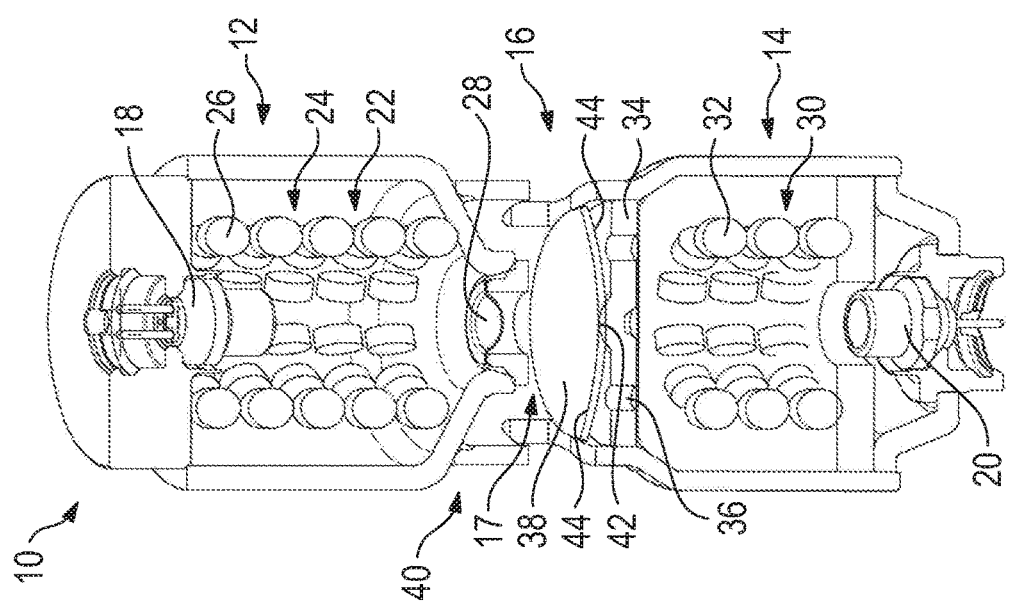
FIG. 2 shows the gas generator from FIG. 1 in the operating case.

FIG. 2 illustrates the gas generator 10 according to the first embodiment in the operating case, viz. upon or after release of the second ignition stage 14.

A comparison of FIGS. 1 and 2 illustrates that the overigniting protection element 38 includes a mounting portion 42 by which the overigniting protection element 38 is tightly connected to the combustion chamber limiting element 34, hence even in the operating case, as is evident from FIG. 2.

For example, the overigniting protection element 38 is welded to the combustion chamber limiting element 34 in the area of the mounting portion 42, thus ensuring that the overigniting protection element 38 will not detach from the combustion chamber limiting element 38 even in the case of activation of the second ignition stage 14.

In the area of the openings 36 of the combustion chamber limiting element 34, the overigniting protection element 38 has a deforming portion 44, on the other hand, which is deformed into the diffusor chamber 17 of the diffusor 16 by activation of the second ignition stage 14 so that the forming inflation gas of the second ignition stage 14 can escape via the deforming portion 44 and the diffusor 16 so as to inflate an airbag not shown here.

In the present case, the deforming portion 44 is a ring, as the overigniting protection element 38 deforms via its radially outer area, if the second ignition stage 14 is activated and gas flows or has flown from the second ignition stage through the openings 36 into the diffusor chamber 17.

In the shown embodiment, the mounting portion 42, which is centrally arranged, consequently is radially surrounded by the deforming portion 44, thus causing the overigniting protection element 38 to extend, in the operating case, into the diffusor chamber 17 at its radially outer edge so as to enable the inflation gas to flow out.

Accordingly, a certain space is formed between the upper side of the combustion chamber limiting element 34, i.e. the side of the combustion chamber limiting element 34 facing the diffusor 16, and the opposite side of the overigniting protection element 38. Said space may also be considered to be an overflow gap for the inflation gas.

Figure 6:
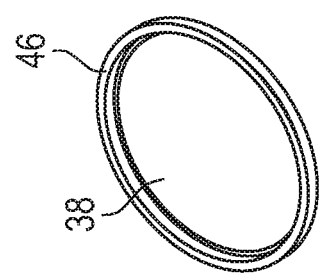
FIG. 6 shows a perspective view of the overigniting protection element according to FIG. 5.
Figure 5:
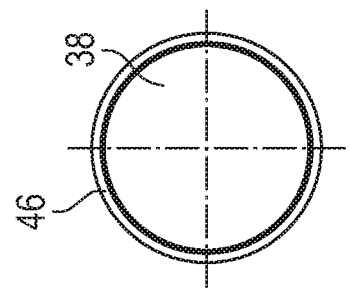
FIG. 5 shows a top view onto an overigniting protection element which is employed in the gas generator according to FIG. 4.
Figure 4:
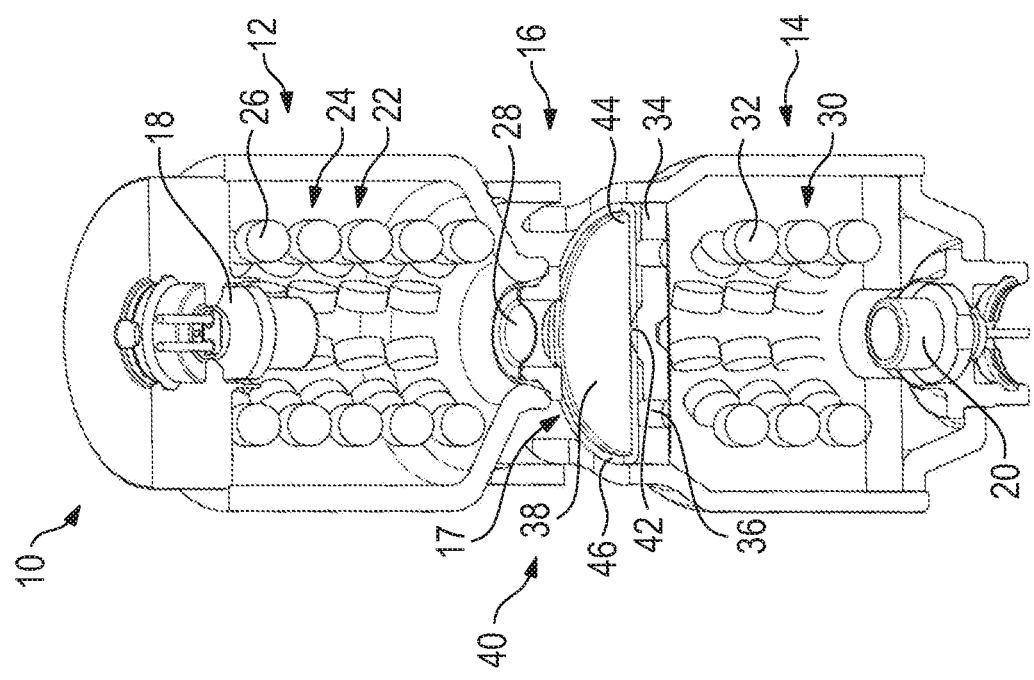
FIG. 4 shows a perspective sectional view of a gas generator according to the invention in accordance with a second embodiment in the initial state.

FIG. 4 shows a second embodiment of the gas generator 10 which differs from the first embodiment by the configuration of the overigniting protection element 38, as is also evident from FIGS. 5 and 6.

In the shown embodiment, the overigniting protection element 38 includes, in addition to the first embodiment according to FIGS. 1 to 3, a radially outer peripheral edge 46 which is moreover collar-shaped. This results in an appropriately better overigniting protection device 40, if only the first ignition stage 12 has been activated. The collar-shaped edge 46 bears via its axially upright portion radially against the housing of the second ignition stage 14 and, resp., in a transition area of the second ignition stage 14 toward the diffusor 16 such that a larger bearing face or, resp., an optimized sealing bearing face is provided.

In general, the overigniting protection element 38 according to this embodiment completely covers the combustion chamber limiting element 34, wherein it is moreover substantially plate-shaped.

Upon release of the first ignition stage 12, the edge 46 then is pressed even more strongly against the respective housing.

Figure 7:
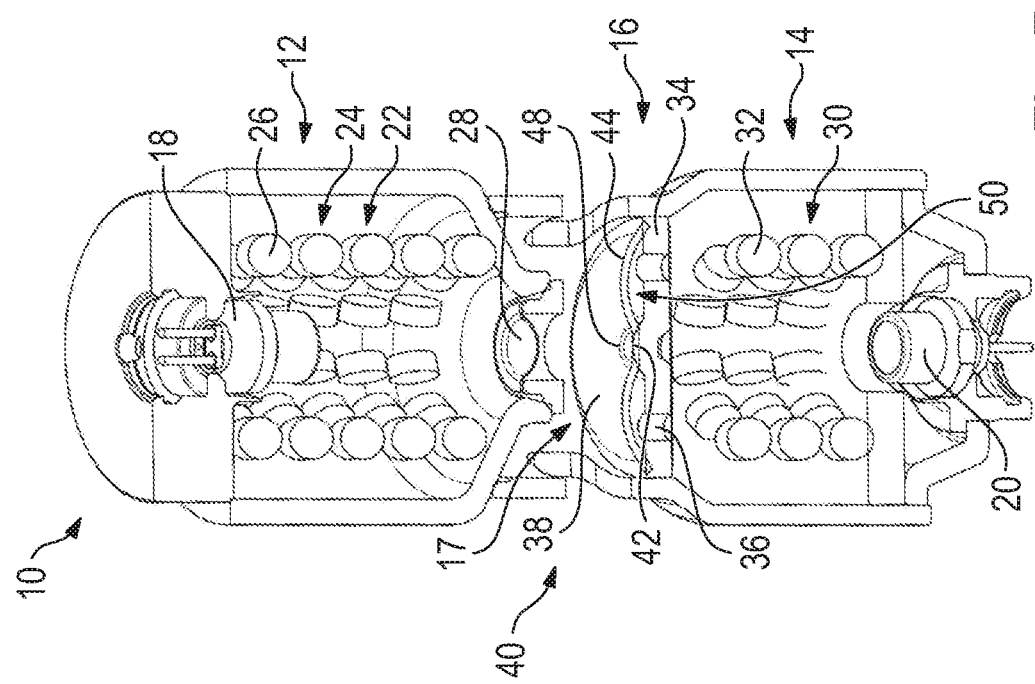
FIG. 7 shows a perspective sectional view of a gas generator according to the invention in accordance with a third embodiment in the initial stage.

In FIG. 7, a third embodiment of the gas generator 10 according to the invention is shown which is different from the first two embodiments by the design of the overigniting protection element 38.

Figure 8:
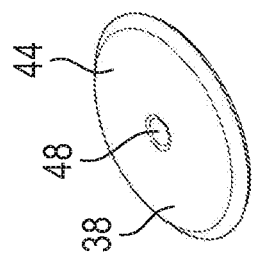
FIG. 8 shows a perspective view of an overigniting protection element which is employed in the gas generator according to FIG. 7.
Figure 9:
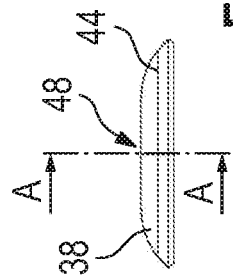
FIG. 9 shows a side view of the overigniting protection element according to FIG. 8.
Figure 10:
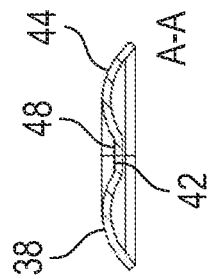
FIG. 10 shows a sectional view of the overigniting protection element according to FIG. 9 along the line A-A.

As is visible from FIGS. 8 to 10, the overigniting protection element 38 includes a central recess 48 which at the same time constitutes the mounting portion 42. Starting from the central recess 48, a respective partially arc-shaped portion is formed radially outwardly so that between the openings 34 and the associated side of the overigniting protection element 38 a cavity 50 will form in which the inflation gas from the second ignition stage 14 can initially accumulate upon activation of the second ignition stage 14. This ensures a different inflation behavior or outflow behavior of the second ignition stage 14.

Consequently, the overigniting protection element 38 according to this embodiment is not plate-shaped. However, it extends over the entire combustion chamber limiting element 34 so that the latter is completely covered, as the radially outer edge bears against the housing of the second ignition stage 14.

The deforming portion 44 again is formed, just as in the second embodiment, by the radially outer area of the overigniting protection element 38 which upon ignition of the second ignition stage 14 deforms into or toward the diffusor chamber 17.

Figure 11:
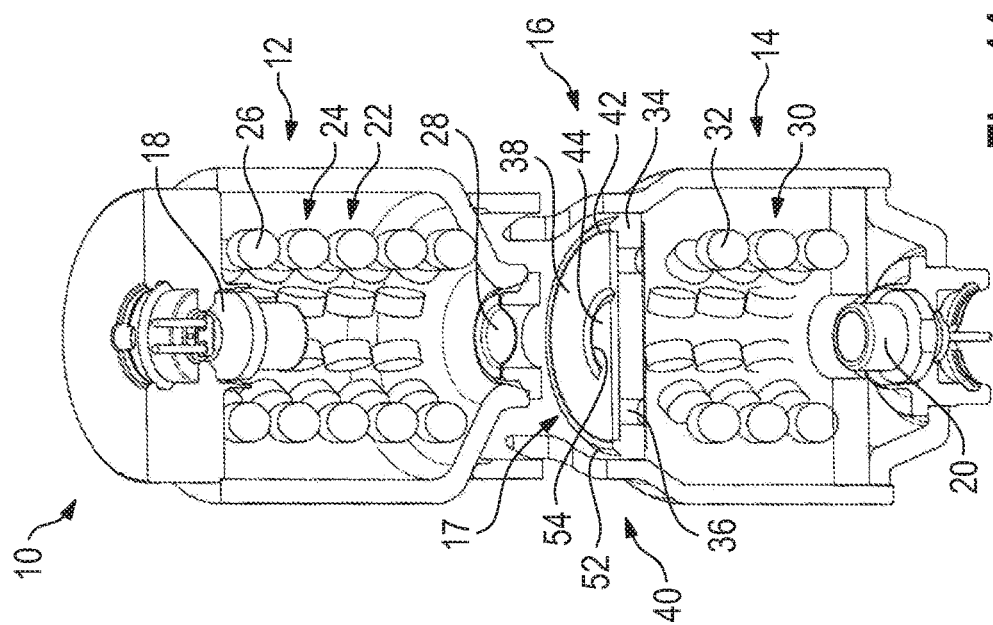
FIG. 11 shows a perspective sectional view of a gas generator according to the invention in accordance with a fourth embodiment in the initial state.

In the embodiment of the gas generator 10 shown in FIG. 11, the overigniting protection device 40 comprises an overigniting protection element 38 that includes a mounting portion 42 arranged radially outside.

In the shown embodiment, the combustion chamber limiting element 34 includes a collar 52 to which the overigniting protection element 38 may be coupled via its mounting portion 42 in the circumferential direction. Accordingly, the overigniting protection element 38 may be tightly connected, especially welded, to the collar 52 at its radially peripheral outer face or outer sidewall and/or may also be appropriately tightly connected, especially welded, to the combustion chamber limiting element 34 to be radially peripheral at a radially peripheral outer area of its end face which is directed to face the combustion chamber limiting element 34.

The overigniting protection element 38 is plate-shaped, wherein at the same time it completely covers the side of the combustion chamber limiting element 34 remote from the second combustion chamber 30 which side is surrounded by the collar 52.

Figure 12:
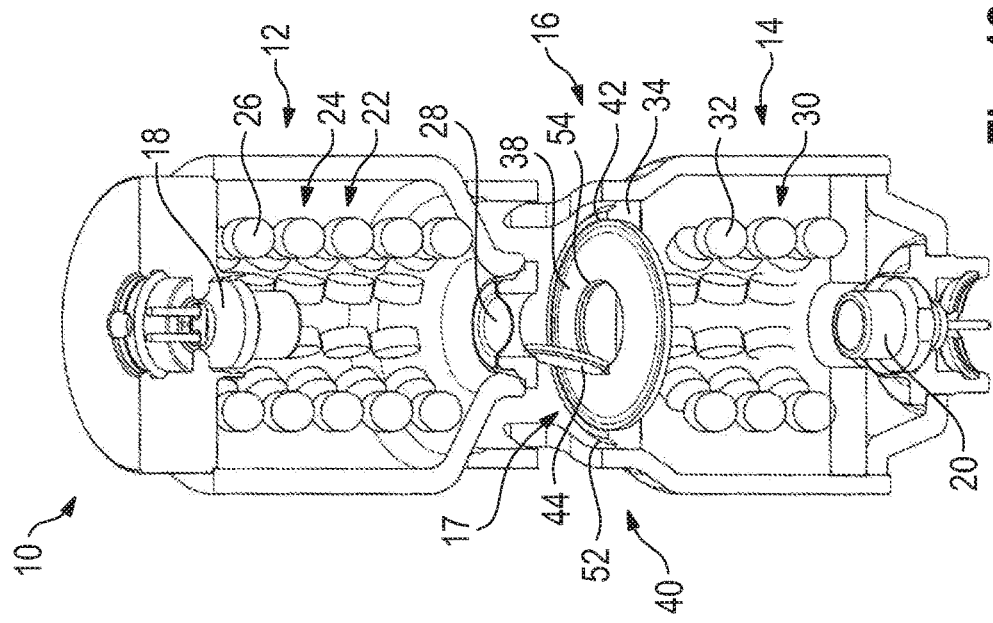
FIG. 12 shows the gas generator according to FIG. 11 in the operating case.

Moreover, the overigniting protection element 38 comprises predetermined rupturing points or predetermined breaking points on its end face directed toward the diffusor space 17 at which points the overigniting protection element 38 ruptures or breaks in the case of release of the second ignition stage 14. This is illustrated in FIG. 12 in which the operating case is shown upon or after activation of the second ignition stage 14.

It is visible therefrom that the area radially inwardly delimited by the predetermined rupturing points or predetermined breaking points 54 still remains coupled to the mounting portion 42, which is why this area can be considered to be a deforming portion 44 which extends into the diffusor chamber 17.

Figure 13:
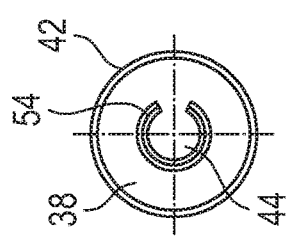
FIG. 13 shows a top view onto an overigniting protection element which is employed in the gas generator of FIGS. 11 and 12.

The predetermined rupturing point or predetermined breaking points 54 are in the form of weakened zones having a smaller residual wall thickness rather than in the form of points open for material passage in the overigniting protection element 38. In the shown embodiment, a central area substantially in the form of a pitch circle is configured as a predetermined rupturing point or predetermined breaking point 54 which can also be understood to be a lining-up of plural predetermined rupturing points or predetermined breaking points 54 in the form of a C-shaped curve, as is especially evident from FIG. 13.

The shape of the predetermined rupturing point or predetermined breaking point 54 and the material depth or residual wall thickness thereof helps to adjust the exhaust behavior of the gas from the second ignition stage 14 into the diffusor chamber 17 and, resp., further into the environment of the gas generator 10.

Figure 14:
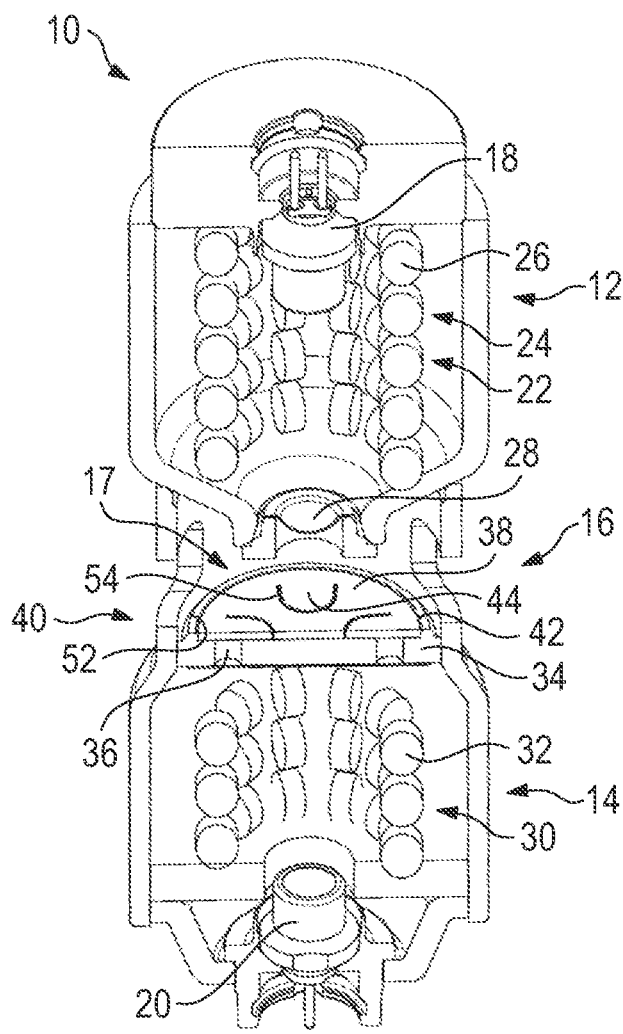
FIG. 14 shows a perspective sectional view of a gas generator according to the invention in accordance with a fifth embodiment in the initial state.

In the embodiment of the gas generator 10 shown in FIG. 14, which substantially corresponds to that of FIG. 11, equally plural predetermined rupturing points or predetermined breaking points 54 spaced apart from each other are provided which define four separated deforming portions 44 extending into the diffusor chamber 17 in the case of release of the second ignition stage 14 so as to release the respective openings 36 in the combustion chamber limiting element 34 so that a fluid communication is present or is provided between the second combustion chamber 30 and the diffusor 16.

Figure 15:
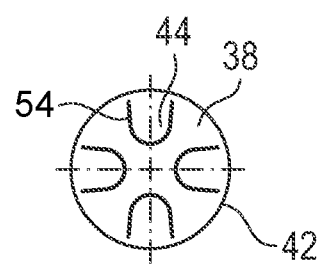
FIG. 15 shows a top view onto an overigniting protection element which is employed in the gas generator according to FIG. 14.

As is evident from FIG. 15, the deforming portions are flap-shaped or substantially U-shaped deforming portions 44 of the overigniting protection element 38 which result in an appropriately defined exhaust behavior.

Figure 16:
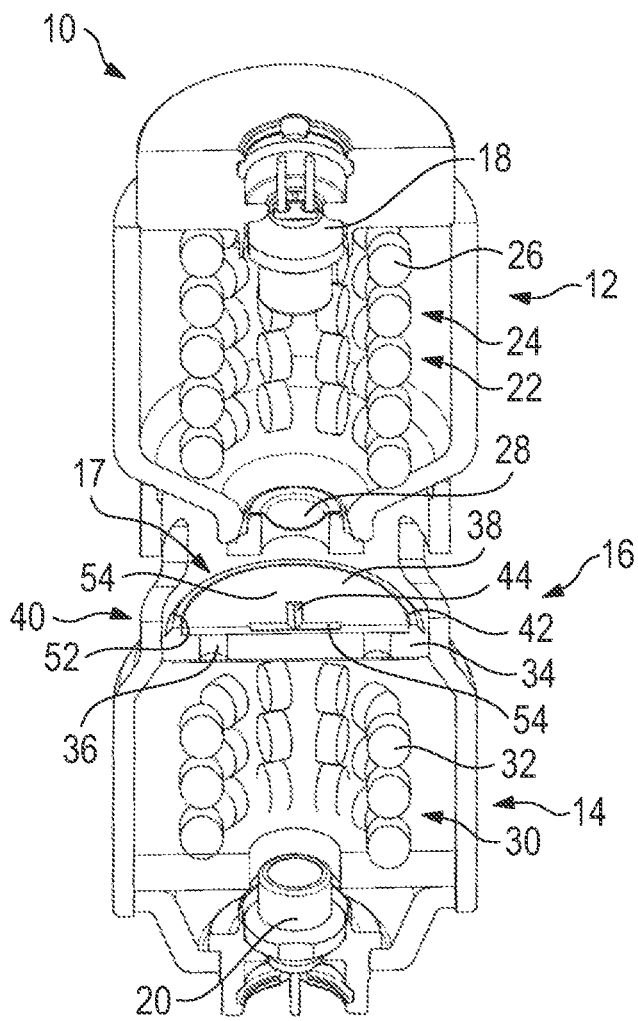
FIG. 16 shows a perspective sectional view of a gas generator according to the invention in accordance with a sixth embodiment in the initial state.
Figure 17:
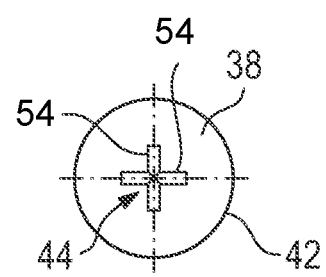
FIG. 17 shows a top view onto an overigniting protection element which is employed in the gas generator according to FIG. 16.

FIG. 16 illustrates another embodiment of the gas generator 10 which is substantially configured just as that of FIGS. 11 and 14.

The overigniting protection device 40 includes predetermined rupturing points or predetermined breaking points 54 arranged centrally in its overigniting protection element 38 which together have a substantially cross-shaped design and result in a substantially cross-shaped deforming portion 44, when the second ignition stage 14 is released.

In the embodiments of FIGS. 11 to 17, the overigniting protection element 38 thus comprises one or more predetermined rupturing points or predetermined breaking points 54 being substantially centrally arranged, with the mounting portion 42 being provided radially outside. For example, the overigniting protection element 38 is tightly connected to the collar 52 of the combustion chamber limiting element 34 via the respective mounting portion 42.

The gas generator 10 may be part of an airbag module which additionally comprises an airbag being inflated by the inflation gas of the gas generator 10.

The invention claimed is:

1. An overigniting protection device for a multi-stage gas generator, comprising:
   a combustion chamber limiting element for limiting a combustion chamber of a second ignition stage of the gas generator, wherein the combustion chamber limiting element comprises one or more openings through which gas flows when the second ignition stage is actuated, wherein the combustion chamber limiting element comprises an annular collar that projects from a surface of the chamber limiting element that is remote from the combustion chamber, the collar having an inward facing inner surface and an outward facing outer surface, wherein the outer surface is spaced inward of an outer peripheral edge of the combustion chamber limiting element; and
   an overigniting protection element comprising a substantially disk-shaped plate secured to the surface of the combustion chamber limiting element remote from the combustion chamber, wherein the overigniting protection element covers the one or more openings of the combustion chamber limiting element;
   wherein the collar is configured to receive the overigniting protection element so that an outer edge of the overigniting protection element extends along the inner surface of the collar and the disk-shaped plate surface of the overigniting protection element lies on the surface of the combustion chamber limiting element remote from the combustion chamber, the overigniting protection element being connected to the combustion chamber limiting element via a mounting portion.

2. The overigniting protection device according to claim 1, wherein the combustion chamber limiting element is a combustion chamber disk.

3. The overigniting protection device according to claim 1, wherein the overigniting protection element is materially mounted to the combustion chamber limiting element in an area of the mounting portion.

4. The overigniting protection device according to claim 1, wherein the overigniting protection element comprises a predetermined rupturing point or a predetermined breaking point via which gas can escape from the second ignition stage.

5. The overigniting protection device according to claim 1, wherein the mounting portion comprises a periphery of the overigniting protection element and is connected to the collar.

6. The overigniting protection device according to claim 1, wherein the outer peripheral edge of the combustion chamber limiting is configured to be connected to a wall of the combustion chamber, and wherein the outer surface of the collar is configured to be spaced from the wall of the combustion chamber when the combustion chamber limiting element is connected to the wall of the combustion chamber.

7. The overigniting protection device according to claim 1, wherein the overigniting protection element has a deforming portion which is deformable such that gas can escape from the second ignition stage via the deforming portion.

8. The overigniting protection device according to claim 7, wherein the deforming portion is arranged centrally on the overigniting protection element.

9. The overigniting protection device according to claim 7, wherein the mounting portion is surrounded by the deforming portion.

10. A gas generator comprising a first ignition stage, a second ignition stage and an overigniting protection device the overigniting protection device being configured in accordance with claim 1.

11. The gas generator according to claim 10, wherein at least the second ignition stage is a purely pyrotechnical ignition stage.

12. The gas generator according to claim 10, wherein the first ignition stage is an ignition stage comprising compressed gas so that the gas generator is a hybrid gas generator.

13. An airbag module comprising a gas generator, an airbag inflatable by the gas generator and a mounting unit for attaching the airbag module to a vehicle, wherein the gas generator is configured in accordance with claim 10.

14. The gas generator according to claim 10, wherein between the first ignition stage and the second ignition stage a diffusor including a diffusor chamber is provided.

15. The gas generator according to claim 14, wherein, after a case of release of the gas generator, the overigniting protection element extends at least partly in a direction of the diffusor chamber.

16. A second ignition stage of a multi-stage gas generator, comprising:
- a combustion chamber;
- a combustion chamber limiting element for limiting a combustion chamber of the second ignition stage of the gas generator, wherein the combustion chamber limiting element comprises one or more openings through which gas fluid flows when the second ignition stage is actuated, wherein the combustion chamber limiting element comprises an annular collar that projects from a surface of the chamber limiting element that is remote from the combustion chamber, the collar having an inward facing inner surface and an outward facing outer surface, wherein the outer surface is spaced inward of an outer peripheral edge of the combustion chamber limiting element; and
- an overigniting protection element comprising a substantially disk-shaped plate secured to the surface of the combustion chamber limiting element remote from the combustion chamber, wherein the overigniting protection element covers the one or more openings of the combustion chamber limiting element;
- wherein the collar is configured to receive the overigniting protection element so that an outer edge of the overigniting protection element extends along the inner surface of the collar and the disk-shaped plate surface of the overigniting protection element lies on the surface of the combustion chamber limiting element remote from the combustion chamber, the overigniting protection element being connected to the combustion chamber limiting element via a mounting portion.

17. The second ignition stage according to claim 16, wherein the overigniting protection element covers openings in the combustion chamber limiting element which are otherwise free from sealing elements.

18. The second ignition stage according to claim 16, wherein the combustion chamber limiting element is a combustion chamber disk.

19. The second ignition stage according to claim 16, wherein the overigniting protection element is welded to the combustion chamber limiting element in an area of the mounting portion.

20. The second ignition stage according to claim 16, wherein the overigniting protection element comprises a predetermined rupturing point or a predetermined breaking point via which gas can escape from the second ignition stage.

21. A gas generator comprising a first ignition stage, a second ignition stage and an overigniting protection device, the second ignition stage being configured in accordance with claim 16.

22. The overigniting protection device according to claim 16, wherein the mounting portion comprises a periphery of the overigniting protection element and is connected to the collar.

23. The overigniting protection device according to claim 16, wherein the outer peripheral edge of the combustion chamber limiting element is configured to be connected to a wall of the combustion chamber, and wherein the outer surface of the collar is configured to be spaced from the wall of the combustion chamber when the combustion chamber limiting element is connected to the wall of the combustion chamber.

24. The second ignition stage according to claim 16, wherein the overigniting protection element has a deforming portion which is deformable such that gas can escape from the second ignition stage via the deforming portion.

25. The second ignition stage according to claim 24, wherein the deforming portion is arranged centrally on the overigniting protection element.

26. The second ignition stage according to claim 24, wherein the mounting portion is surrounded by the deforming portion.

* * * * *